US011657540B2

United States Patent
Wrinch (10) Patent No.: US 11,657,540 B2
(45) Date of Patent: May 23, 2023

(54) COMPRESSION OF ULTRASOUND DATA IN FLUID CONDUITS

(71) Applicant: DarkVision Technologies Inc., North Vancouver (CA)

(72) Inventor: Steven Wrinch, North Vancouver (CA)

(73) Assignee: DarkVision Technologies Inc, North Vancouver (CA)

( * ) Notice: Subject to any disclaimer, the term of this patent is extended or adjusted under 35 U.S.C. 154(b) by 259 days.

(21) Appl. No.: 16/911,041

(22) Filed: Jun. 24, 2020

(65) Prior Publication Data

US 2020/0402262 A1    Dec. 24, 2020

(30) Foreign Application Priority Data

Jun. 24, 2019  (GB) .................................. 1909053.9

(51) Int. Cl.
*G06T 9/00*   (2006.01)
*G06T 7/62*   (2017.01)
*G06T 5/00*   (2006.01)

(52) U.S. Cl.
CPC .................. *G06T 9/00* (2013.01); *G06T 5/00* (2013.01); *G06T 7/62* (2017.01); *G06T 2207/10016* (2013.01); *G06T 2207/10072* (2013.01); *G06T 2207/10132* (2013.01)

(58) Field of Classification Search
CPC .... G06T 9/00; G06T 7/62; G06T 5/00; G06T 2207/10016; G06T 2207/10072; G06T 2207/10132
USPC ........................................................ 382/100
See application file for complete search history.

(56) References Cited

U.S. PATENT DOCUMENTS

| 4,733,380 | A | 3/1988 | Havira | |
| 9,866,835 | B2 * | 1/2018 | Gelman | ................. H04N 19/85 |
| 10,827,190 | B1 * | 11/2020 | Blasch | ................... H04N 19/85 |
| 2003/0028113 | A1 | 2/2003 | Gilbert et al. | |
| 2004/0022447 | A1 * | 2/2004 | Mukhopadhyay | ........ G06T 9/00 382/243 |

(Continued)

FOREIGN PATENT DOCUMENTS

JP    2009177546 A    8/2009

OTHER PUBLICATIONS

Office action received for CA application No. 3084638, dated Oct. 14, 2021, 4 pages.

(Continued)

*Primary Examiner* — Michael R Neff (57) ABSTRACT

A device and method used to image cylindrical fluid conduits, such as pipes, wellbores and tubulars, with ultrasound transducers then compress that data for storage or visualization. The compressed images may be stored on the tool and/or transmitted over telemetry, enabling the device to inspect and record long pipes or wells in high resolution on a single trip. This allow the ultrasound imaging tool to record much longer wells in higher resolution than would otherwise be possible. An outward-facing radial array of ultrasound transducers captures cross-sectional slices of the conduit to create frames from scan lines. The frames are compressed by applying a demodulation process and spatial conversion process to the scan lines. Video compression is applied to the to the demodulated, spatially converted ultrasound images to return compressed images.

19 Claims, 7 Drawing Sheets

(56) References Cited

U.S. PATENT DOCUMENTS

2007/0112269 A1\* 5/2007 Germond-Rouet ........................
　　　　　　　　　　　　　　　　　　　　　G01S 7/52046
　　　　　　　　　　　　　　　　　　　　　　　　600/443
2016/0108730 A1\* 4/2016 Fanini .................... G01S 15/87
　　　　　　　　　　　　　　　　　　　　　　　　73/152.42
2016/0290847 A1　10/2016 Gronsberg
2018/0156025 A1　6/2018 Manders et al.
2019/0014345 A1\* 1/2019 Gelman ......... H04N 21/234381

OTHER PUBLICATIONS

Office action and Search Report received for NO application No. 20200736, dated Jan. 28, 2021, 7 pages.

\* cited by examiner

COMPRESSION OF ULTRASOUND DATA IN FLUID CONDUITS

RELATED APPLICATIONS

This application claims priority to GB Application No. 1909053.9, filed on Jun. 24, 2019, the disclosure of which is incorporated herein by reference in its entirety.

FIELD OF THE INVENTION

The invention relates generally to inspection of fluid-carrying conduits, in particular, acoustic sensors in oil & gas wells, water wells, geothermal wells, water mains or pipelines.

BACKGROUND OF THE INVENTION

In wells and fluid carrying pipes, such as oil wells and water delivery infrastructure, there often arises a need to inspect the internal structure for integrity or obstructions. For example, hydrocarbons in production casing may contaminate ground water if there are cracks or deformations in the casing. Similarly, water resources may be lost to leaks in water mains. Ultrasound is a known way of imaging such structures to detect problems thus protecting the environment.

Ultrasound tools record a vast amount of sensor data as they move through the fluid conduits with no reliable way to a surface computer. Thus there is a need to compress and store the sensor data on the tool or send a compressed stream over telemetry to the surface computer. Similarly, the data may be stored on a server, remote from the operator's computer requesting the data. Streaming the raw data to the operator's computer would be slow.

SUMMARY OF THE INVENTION

The present invention aims to address one or more of the above shortcomings by compressing the ultrasound data. There are properties of the cylindrical conduit and sensors on the tool that may be used to improve compression and visualization.

In accordance with a first aspect of the invention there is provided a method of imaging a cylindrical fluid conduit. The method comprises deploying and moving an ultrasound imaging device through the conduit, the device comprising a radial array of ultrasound transducers; capturing cross-sectional slices of the conduit using the radial array to create frames having plural scan lines; applying a demodulation process and spatial conversion process to the scan lines; creating an uncompressed ultrasound image comprising the demodulated, spatially converted scan lines; and applying video compression to the ultrasound image to return compressed images.

The method's output may include two streams of compressed images of different bandwidths, a) a first stream of low-bandwidth compressed images, which is transmitted to a surface computer for real-time monitoring and b) a second stream of high-bandwidth compressed images, which is stored on non-volatile memory of the device.

The spatial conversion process may comprise converting scan lines from temporal dimensions to spatial dimensions, preferably with consistent spatial unit steps.

The video compression includes AVC (H.264), HEVC (H.265), VP9 or variant thereof.

The method may determine a speed of sound of a fluid in the conduit and the spatial conversion process may create a spatial pixel from one or more samples in the scan line, using the determined speed of sound, preferably repeatedly determining the speed of sound while moving through the conduit to update the spatial conversion The method may apply companding, preferably μ-law quantization, to the ultrasound image.

The method may uncompress the compressed images at a processor separate from the imaging device and creating a 2D or 3D visualization of the conduit. The visualization may be in the spatially-converted dimensions.

The scan lines may comprise data received during a pre-set receive window and the method may determine the inner and outer radii of the conduit then reduce the ultrasound image to pixels substantially between the determined inner and outer radii.

The method may filter uncompressed ultrasound images to remove certain features after demodulation.

In accordance with a second aspect of the invention there is provided a device for imaging a conduit comprising: an elongate body deployable in a cylindrical fluid conduit; an outward-facing radial array of ultrasound transducers for capturing cross-sectional slices of the conduit; and a processor. The processor compresses the frames by: applying a demodulation process and spatial conversion process to the scan lines; creating an uncompressed ultrasound image comprising the demodulated, spatially converted scan lines; and applying video compression to the ultrasound image to return compressed images.

The device may comprise a non-volatile memory and a telemetry unit for transmitting data to a surface computer. The device may comprise one or more sensors for measuring properties of the fluid or the transducer's position relative to the conduit, and wherein the processor uses these sensor(s) in the spatial conversion process.

Further aspects of the invention are set out below and in the appended claims. Thus preferred embodiments of the invention enable the device to image conduits, such as pipes and wells over long distances, providing the image data for real-time monitoring or subsequent visualization.

BRIEF DESCRIPTION OF THE DRAWINGS

Various objects, features and advantages of the invention will be apparent from the following description of embodiments of the invention, as illustrated in the accompanying drawings. The drawings are not necessarily to scale, emphasis instead being placed upon illustrating the principles of various embodiments of the invention.

Similar reference numerals indicate similar components having the following key.

2 fluid-carrying conduit, such as a well, pipe, borehole, tubing, or casing;
10 imaging device;
11 scan line;
12 acoustic array;
13 transducer element;
14 device processing circuit;
15 acoustic aperture;
16 body;
17 wireline;
18 operations site;
19 remote visualization computer system
20 centralizers;
27 inner radius to capture;
28 outer radius to capture;
33 Telemetry unit at Operations site;
34 Telemetry unit on device;
35 Instruction memory;
36 ultrasound data memory;
37 non-volatile compressed image storage
80 Analogue Front End;
81 HV Pulser;
82 HV Mux/Demux;
83 HV Protection switch;
84 FPGA;
85 ADC;
86 Amplifiers (including DVGA, LNA, and Summing Amps);
87 Image processor;
88 Rx beamforming; and
89 Tx beamforming.

DETAILED DESCRIPTION OF THE INVENTION

With reference to the figures, devices and methods are disclosed for capturing and compressing ultrasound reflections from a fluid-carrying conduit by an ultrasound transducer array. This conduit may be a well/pipe for carrying hydrocarbons or water and having an elongate, cylindrical form factor through which the device can move longitudinally. The device typically also has an elongate form factor and is sized to be deployable within the well or pipe. Wells include cased and uncased wells, at any stage from during drilling to completion to production to abandonment.

Figure 1:
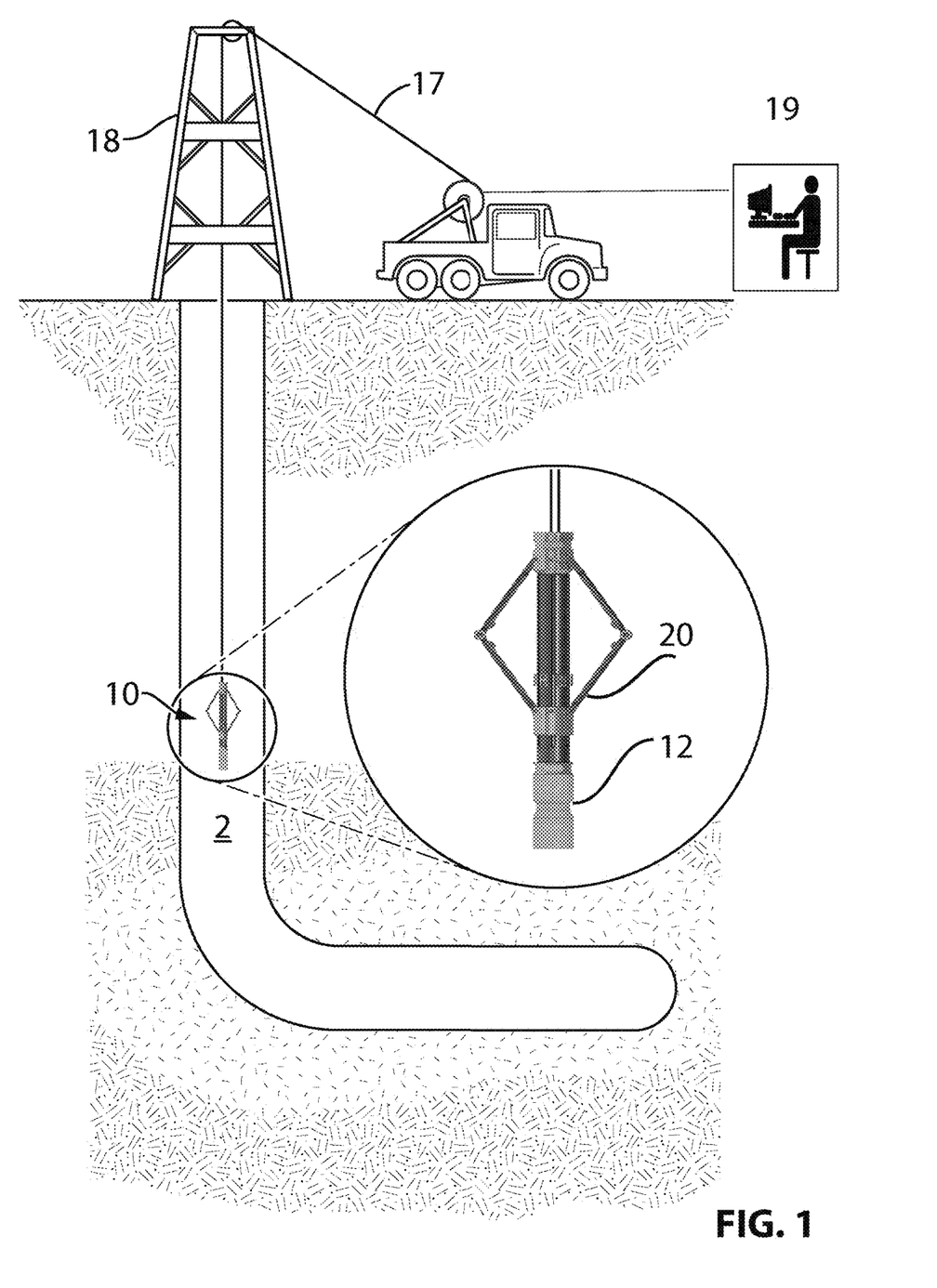
FIG. 1 is a cross-sectional view of an imaging device deployed in a wellbore in accordance with one embodiment of the invention.
Figure 2:
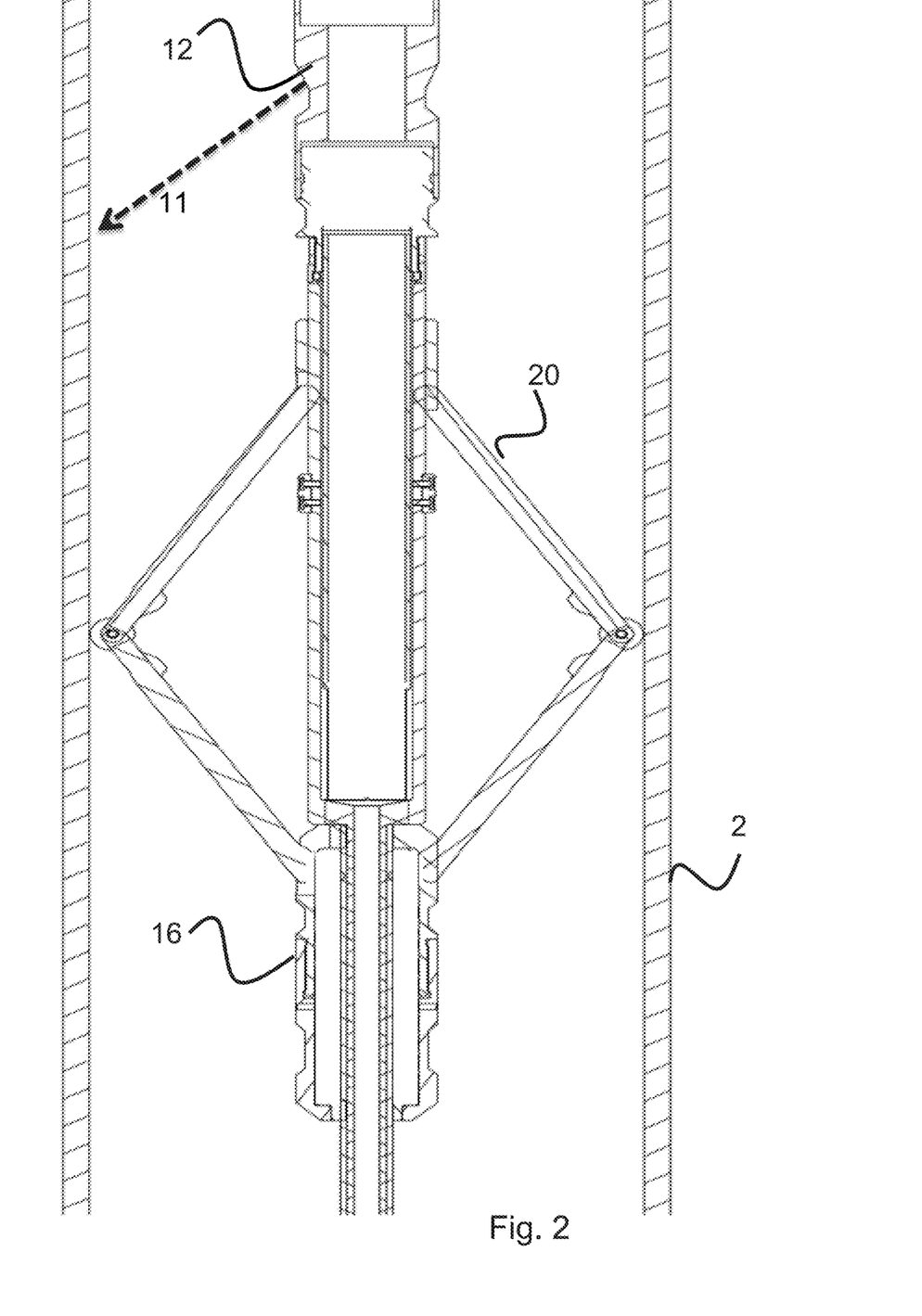
FIG. 2 is a cross-sectional view of an imaging device in a well.

In accordance with one embodiment of the invention, there is provided an imaging device 10 for imaging a fluid conduit 2, as illustrated in FIGS. 1 and 2. The imaging device 10 generally comprises an ultrasound transducer array 12, a body 16, and one or more centralizing elements 20. The imaging device logs large amounts volumetric data of the conduit as it is pulled or tractored through the conduit. Transducers The array comprises a plurality of acoustic transducer elements 13, preferably operating in the ultrasound band, preferably arranged as an evenly spaced one-dimensional radial array (see FIGS. 3A, 3B). The frequency of the ultrasound waves generated by the transducer(s) is generally in the range of 200 kHz to 30 MHz, and may be dependent upon several factors, including the fluid types and velocities in the well or pipe and the speed at which the imaging device is moving. In most uses, the wave frequency is 1 to 10 MHz, which provides reflection from micron features. The transducers may be piezoelectric, such as the ceramic material, PZT (lead zirconate titanate). Such transducers and their operation are well known and commonly available. Circuits 14 to drive and capture these arrays are also commonly available.

The number of individual elements in the transducer array affects the azimuthal resolution of the generated images. Typically, each transducer array is made up of 32 to 2048 elements and preferably 128 to 1024 elements. The logging speed and frame rate determines the axial resolution. Multiple transducer elements, per aperture 15, operate in a phase delayed mode to generate a scan line. There may be as many scan lines as elements by changing the aperture by a single element for each scan line.

Figure 3A:
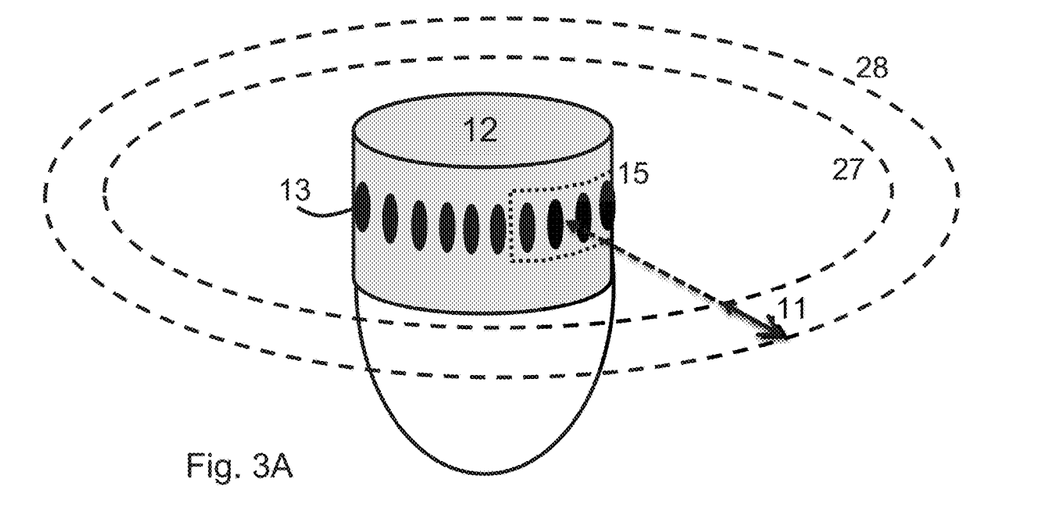
FIG. 3A is a perspective-view of a radial acoustic array and its imaging field.

The transducer elements 13 may be distributed radially, equidistant around the body of the device. As seen in FIG. 3A, the transducer elements 13 may be substantially outward, radially-facing. A first reflection is received from the inner wall and then a second reflection is received from the outer wall. However, there may be multiple reflections as the wave bounces between walls. A receive window Rx is pre-set by the operator or device for when the processing circuit 14 should start and end recording of reflected waves. For example, in the case of a large diameter, thick casing in fluid with a slow speed of sound, the device can start recording later and for longer.

This transducer arrangement captures a ring-shaped cross-sectional slice (from 27 to 28) of the well covering 360° around the array 12 and is useful for thickness measurements. As the device is moved axially in the well or pipe, in either direction, the ring-shaped transducer continually captures slices of the well that are perpendicular to the longitudinal axis of the well (see FIG. 7). Thousands of these slices are combined to create a 3D visualization of the well.

Figure 3B:
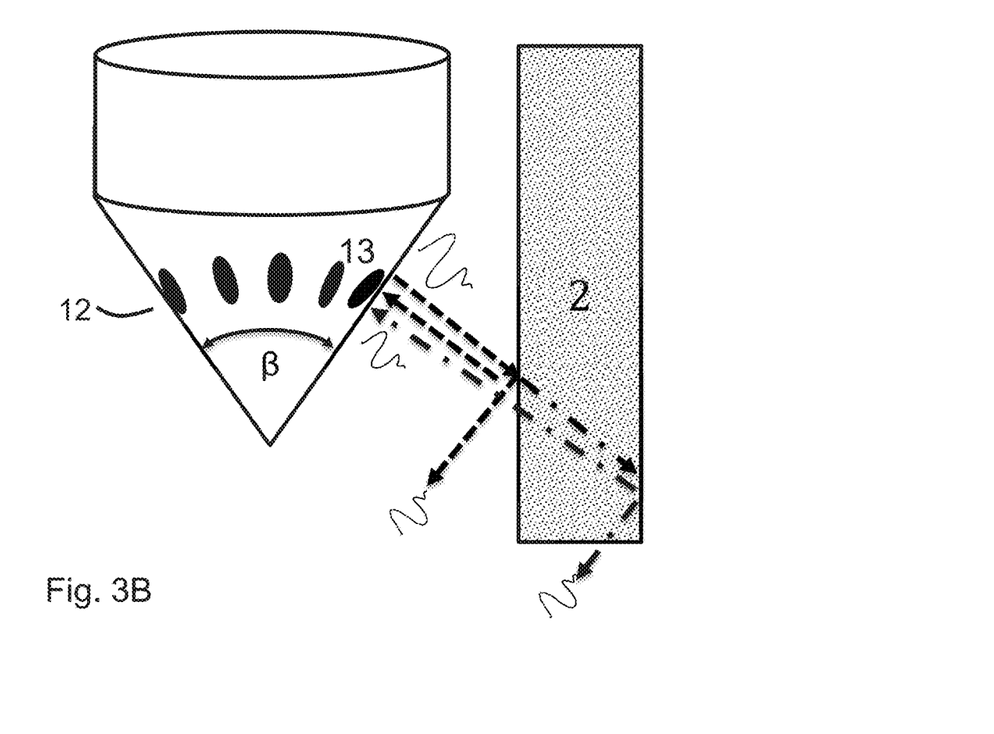
FIG. 3B is a perspective-view of a radial acoustic array in a conical arrangement.

In the alternative arrangement of FIG. 3B, the transducer elements are distributed on a frustoconical surface with elements 13 facing partially in the longitudinal direction of the device, (and thus in the longitudinal direction when in the well). Thus, the radial transducers are angled uphole or downhole to form an oblique-shaped conical field of view. The cone may have a cone angle β of 10-45°, preferably about 20'. In this arrangement, much of the sound wave reflects further downward, but a small portion backscatters off imperfection on the surfaces or voids within the wall back towards the transducer. FIG. 3B shows acoustic pulses (moving in the direction of the dashed lines) transmitted towards inner wall, most of which bounces downward and some backwards to the transducer 13. Some of the wave energy (dot-dashed lines) propagates to the outer wall, then bounces downward and partially back to the transducer.

This conical design may also face uphole, i.e. towards the proximal end of the device and the operator. The array 12 may be located at an end of the device (e.g. FIGS. 3A, 3B) or between the ends (e.g. FIG. 2).

Figure 4:
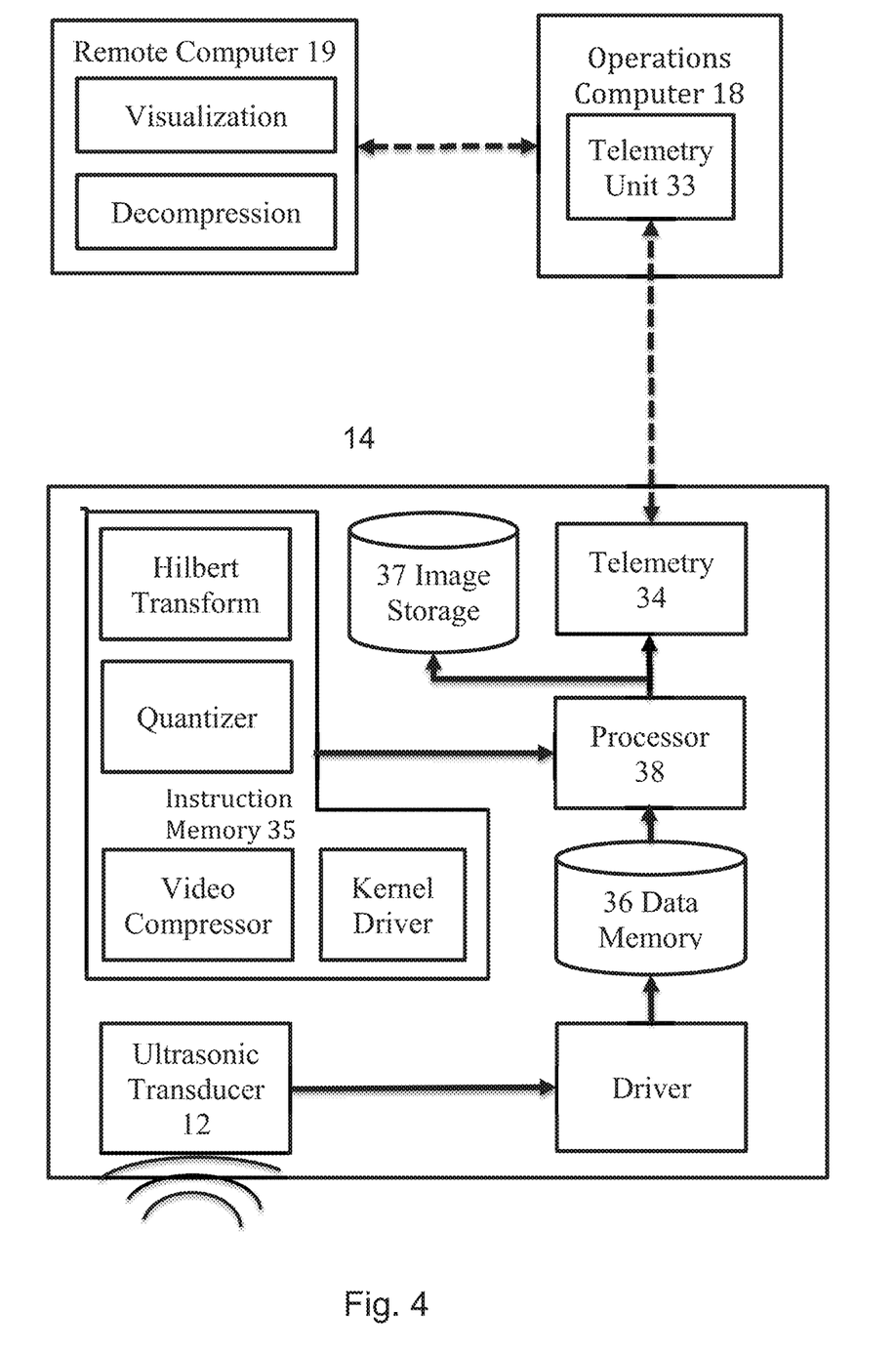
FIG. 4 is a block diagram for compressing ultrasound data.
Figure 5:
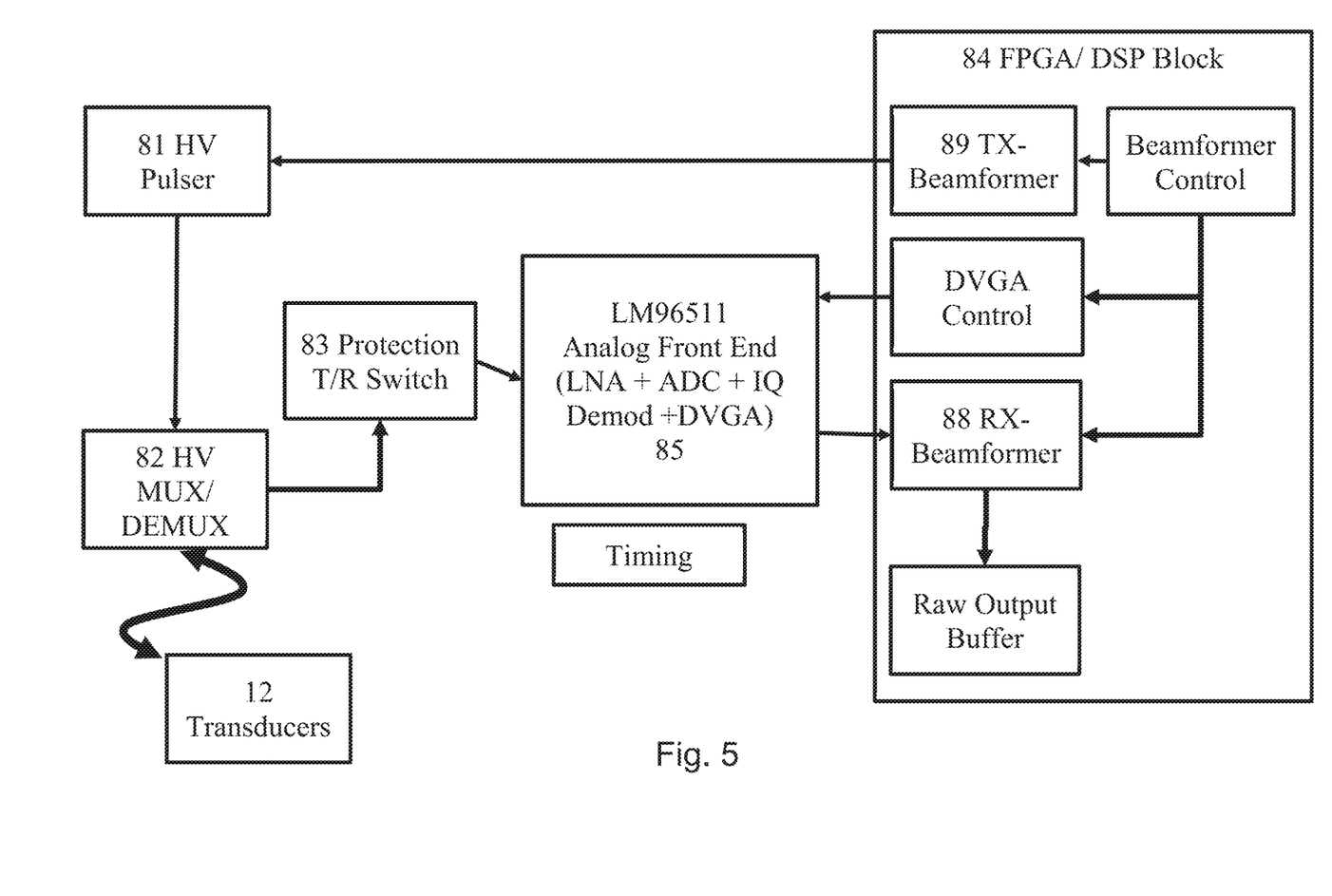
FIG. 5 is a circuit block diagram for driving ultrasound transducers.
Figure 6:
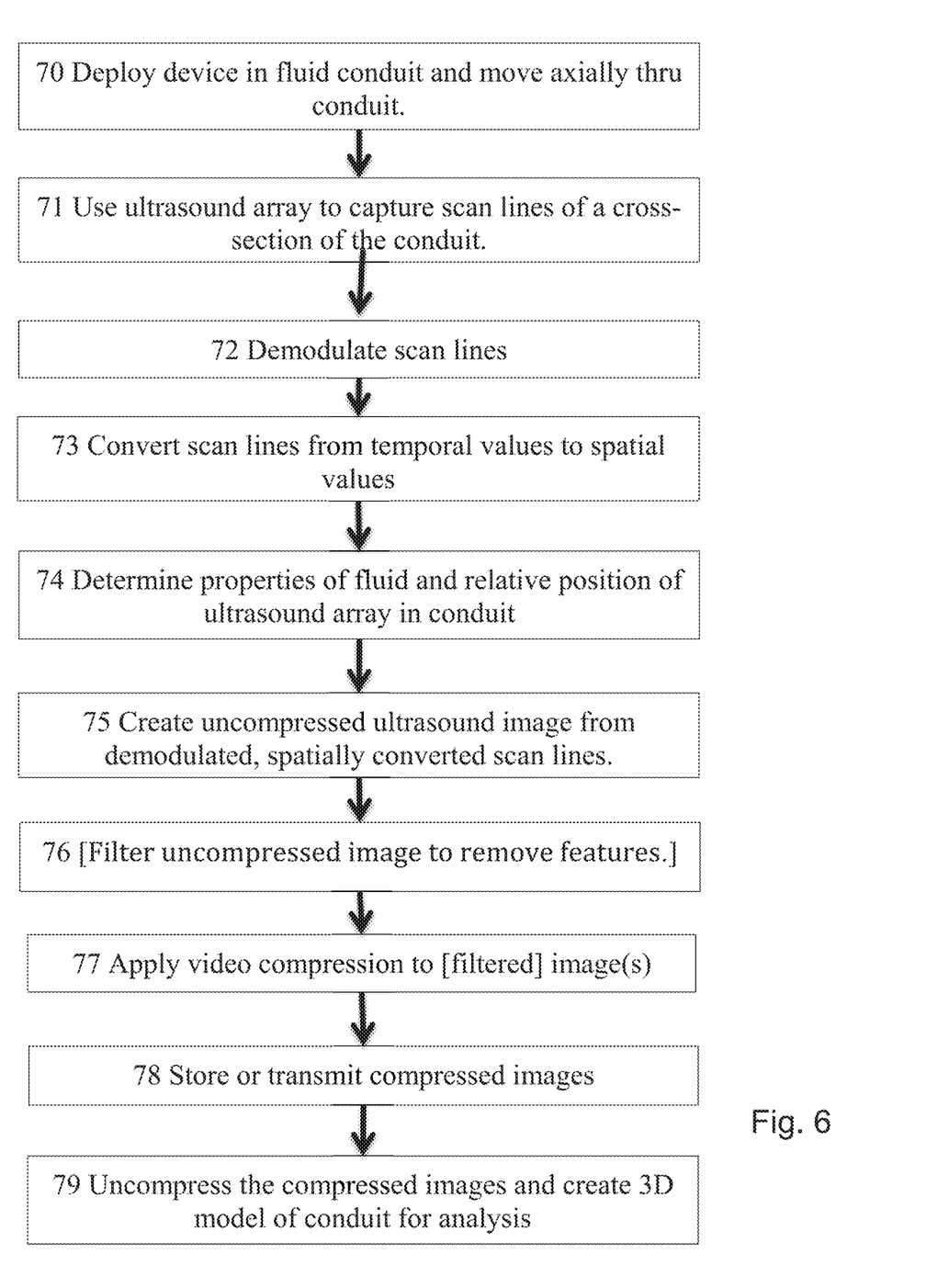
FIG. 6 is a flow diagram for compressing ultrasound data.

FIG. 5 shows an example circuit dedicated to transmitting, receiving and processing ultrasound waves. These circuits are common in ultrasound imaging and the skilled person is assumed to be familiar with chips, such as LM96511 from Texas Instruments. The raw, digital data of FIG. 5 is written to Data Memory 36, shown in FIG. 4.

Compression

A logging operation may amass hours and terabytes of ultrasound data, which may be sent to the remote computer 18 over a low-bandwidth telemetry system 33, 34 in real-time. The data may also be sent to an operator 19 for offline visualization and analysis from cloud storage. The present system comprises processing circuitry and software for ultrasound compression and decompression.

Figure 7:
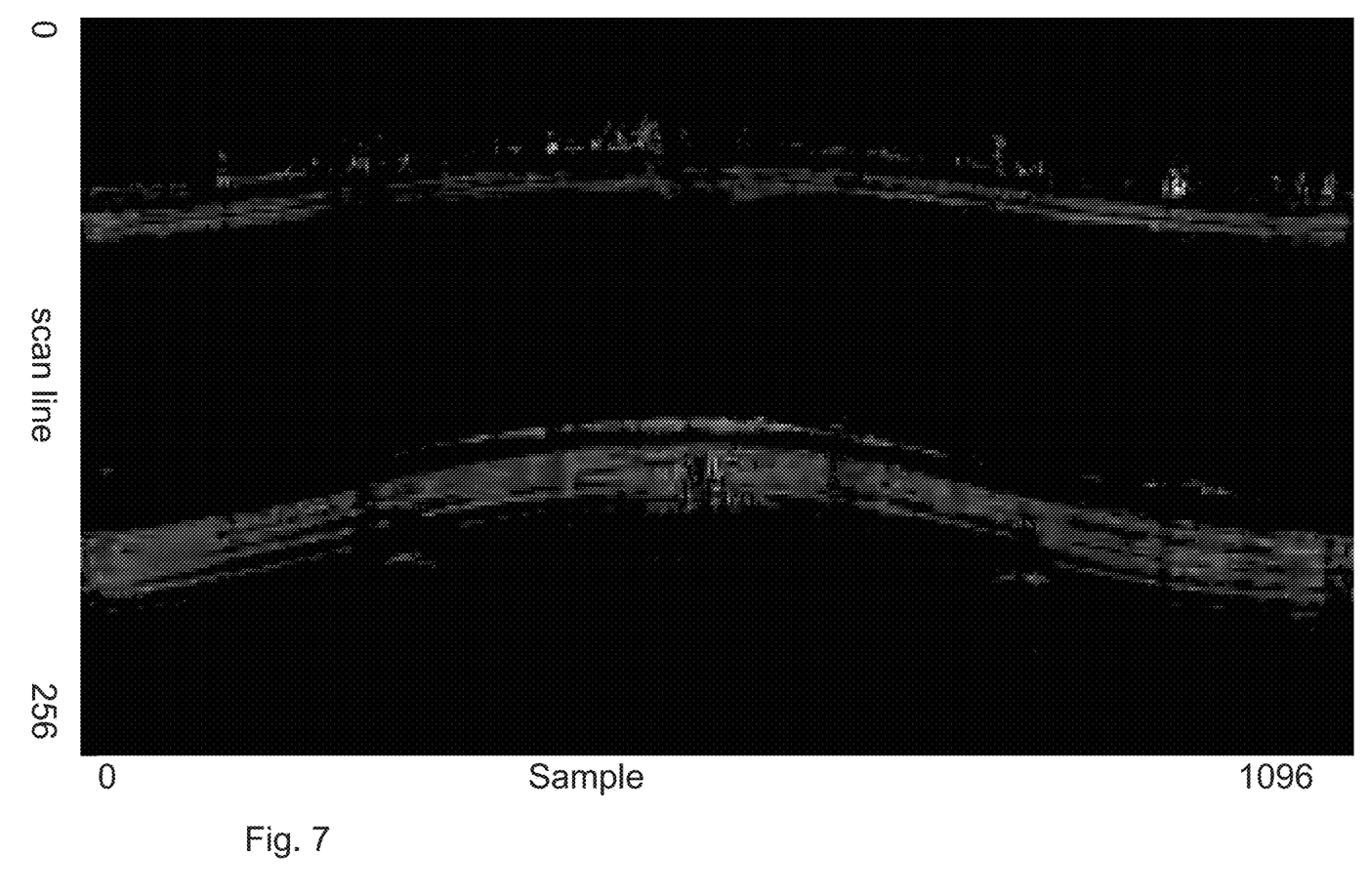
FIG. 7 is an ultrasound image of a cylindrical conduit.

FIG. 7 is an ultrasound image for a single frame in the theta (Θ)-radial (R) plane, where the first and last scan line capture substantially the same azimuth. The image is unwrapped, in the sense that the physical representation would be a circular cross-section. Scan lines are in the azimuthal (Θ) dimension and the time-of-flight reflections (aka depth or thickness data) are in the radial dimension.

Each scan line may be sampled between about 100 and 1000 times and converted by ADC 85 to 16-bit signed digital data. Each scan line may be demodulated, such as by a Hilbert Transform to find envelopes of reflected waves. The output is positive and thus returns 15-bit unsigned data. Demodulation may be performed by an FPGA or a processor running a demodulation function.

The data's dynamic range may be reduced by quantization/companding, such as µ-law companding to reduce the range to 8-bits, 10-bits or 12-bits.

Then the data as a frame is compressed using video compression techniques, such as AVC H.264 or HEVC H.265, VP9 or variants. Such codecs may be implemented in software, using a dedicated circuit (e.g. FPGA) or on a GPU to output compressed data. The underlying data is not truly video, as frame-to-frame changes are not in time, but in depth along the pipe.

These compression techniques typically comprise two compression aspects: temporal compression and inter-frame compression. Firstly, key frames (I-frames) capture full image data and subsequent frames (P-frames—predicted frames, and B-frames—bidirectional predicted frames) represent calculated differences from key frames and preceding difference frames. The temporal compression aspect divides an image into macroblocks of smaller segments (for instance 16×16 or 64×64 pixels), whereby parts of the image that don't change frame-by-frame can be heavily compressed to improve the compression ratios.

FIG. 7 provides an exemplary frame in B-mode having a depth of 1096 samples and 256 scan lines, which unwrapped looks like two sinusoidal reflections from inner and outer walls plus features in the fluid. The sinusoidal surface reflections would be vertical lines in the ideal case of perfect centralization within the pipe or well.

While the native units of the ultrasound image pixels are sample number and scan lines, this has performance implications in later visualization processing (e.g. data read performance and non-uniform voxel dimensions due to un-equal coordinate space resolution) and thus it is advantageous to convert samples to spatial dimensions (e.g. mm and arc-radians). For example, a GPU shader or edge detection process may be improved by operating on more uniform voxel dimensions and better performance through more efficient texture and memory cache usage. Also, more sophisticated sampling techniques can be done in software. For example, downsampling of the data may use a) median of pixel range b) average pixel range or c) fixed step sample), whereas a GPU typically only does fixed step sampling as programmed by the volumetric pixel shader and GPU texture sampling hardware, which may not accurately reflect the actual sample distribution in the downsampling window. It is advantageous to have the downsample target resolution be roughly similar to the volumetric pixel shader step size for the volumetric ray marching shader. i.e. downsample to 0.25 mm pixel sizes, then have the shader step in 0.25 mm steps in the shader module, which would accumulate the median value across the sample range. The processor can take advantage of physically neighboring parts of the conduit being adjacent in storage memory, which is most efficient when loading chunks of data at once into local video memory. Conversely, in the spatially unconverted space, physically neighboring sample points may be highly separated in storage and so each process will incur many more memory cache misses to read the real-world neighboring sample points.

Part of the real-world consideration for logging a well or pipe includes that 1) the diameter may change, 2) the device may employ plural transducer arrays having different scan lines, 3) different scan modalities may be selected, 4) the speed of sound in the fluid may vary, 5) the frame and logging speed may change, and 5) different Rx windows may be selected.

Thus ultrasound data may be converted, for dimensions native to the device, such as from frame/scan line/sample count to distances (e.g. mm/milli radians/mm). Each scan line set of data points is natively in temporal dimensions of sample times, which effectively measures time-of-flight of the wave. For example, 1024 samples in a scan line are combined and interpolated to 192 pixels, where each 5.33 samples equate to a single 0.25 mm pixel. This conversion was advantageously to a consistent spatial unit step (0.25 mm). This is preferably performed after demodulation and before compression and quantization.

This conversion depends on the sampling rate, scanning geometry and the speed of sound in the medium. At 20 MHz, each sample in a scan line is 50 ns apart, during which time a wave travels 75 um in water (but further in the steel pipe). For the perpendicular array in pulse-echo operation (per FIG. 3A), the wave will travel out and back 37.5 um, so this becomes the spatial pixel step if one doesn't combine multiple samples per spatial pixel. The precise conversion will depend on the speed of sound that varies in fluids throughout the conduit and the conduit material itself. However, this level of precision may be left to the visualization process and an approximate sample-spatial conversion made prior to video compression.

Thus it is advantageous to determine or measure the local speed of sound in the conduit. This may be done using a calibration transducer or determined from the average observed time of flight for waves to travel in the cylindrical conduit of a known or expected diameter. The speed of sound may also be stored with a set of frames. This determination may be made repeatedly as the device travels through the conduit, as the speed changes with depth, pressure, fluid type and temperature. Each speed of sound determination is useful for spatial conversion ratio for temporally proximate frames.

It is worth noting that the first sample captured does not correspond to zero seconds or zero distance from the transducer, but rather to the beginning of the Rx window, which is adjustable. Thus the Rx window parameters are stored by the circuit for a set of frames and thus the start of an image frame corresponds to some significant distance from the center of the conduit.

A further complication of logging a long cylindrical conduit with an elongate, generally cylindrical, imaging device is that there is likely to be some relative axial rotation. Thus reconstruction of the conduit from a set of consecutive slices is improved by determining the azimuthal direction, rotational offset or rotational datum of the device. Such a value can be recorded for the frames so that the visualization module can compensate adjacent image slices.

Alternatively, this determined rotation is used to re-order the scan lines in the image, as there is no true edge of the ultrasound image in a 360° radial scan. For example, a gyroscopic sensor in the device measures the change in orientation of the device frame-to-frame and compensates by sliding the order of the scan lines used to create the image by a commensurate amount. Thus the first scan line in the image could always correspond to the top of the pipe, making subsequent visualization faster.

The process optionally includes a filtering step to remove noise, eliminate certain regions, and detect edges. The filtering step may be low-pass, high-pass, band-pass and amplitude filtering on RF modulated data or edge detection filter, first surface filter, denoise filter, truncate filter, median filter, gaussian filter, glint and secondary reflection filtering. This step removes features from areas or low importance and makes compression even more effective. For example, low-pass filters can remove white noise, thresholding post-demodulation can remove small features, and edge detection can identify the pipe walls, between which walls are the areas of most interest. The areas of less interest (e.g. inside or outside the pipe) may be cropped from the image or set to a fixed value for maximum compression. Thus the (uncompressed) ultrasound image is reduced to the pixels substantially between the determined inner and outer radii of the conduit, including a few pixels outside of these radii in order to capture near-surface features.

In one embodiment, multiple frames are combined into a super-image to be compressed. This has the advantage of saving overhead for each compressed image and reducing the need for padding each image to fit the fixed video memory/GPU size. The repeated patterns seen frame to frame, which are continuous at their edges due to the circular nature of the pipe, means that compression operates well even for boxes spanning multiple stacked frames.

The compressed images may be stored on non-volatile memory of the device (aka as a Memory Tool). Additionally or alternatively, the compressed images may be transmitted over a telemetry unit of the device to a corresponding telemetry unit of the surface computer system. While well telemetry may be limited to about 20-40 KB per second, SD-memory may upload data at 2-10 MB per second.

Given the relative bandwidths of memory and telemetry, in certain embodiments, two streams of differently compressed images are generated substantially in parallel: a) a first stream of low-bandwidth (low-quality, high-compression ratio) compressed images, which is transmitted to a surface computer for real-time monitoring and b) a second stream of high-bandwidth (high-quality, low-compression ratio) compressed images, which is stored on non-volatile memory of the device. There is opportunity to modify one or more of the data processing steps to optimize for size, latency, and quality in each stream.

For example, the low-bandwidth stream may be generated by one or more of: 1) downsampling the uncompressed image (e.g. removing or combining frames, scan lines and scan line pixels); 2) companding to reduce the dynamic range of images to 6 or 8-bits (instead of 10 or 12 bits); 3) selecting parameters of the video compression codec for higher compression ratio, such as including less vectors or key frames; OR 4) filtering out data in areas of low interest (such as within or beyond the conduit structure) in the uncompressed images.

It will be appreciated that data processing may be performed with plural processors: on the device, at the operations site, and optionally on a remote computer. The term 'processor' is intended to include computer processors, cloud processors, microcontrollers, firmware, GPUs, FPGAs, and electrical circuits that manipulate analogue or digital signals. While it can be convenient to process data as described herein, using software on a general computer, many of the steps could be implemented with purpose-built circuits. In preferred embodiments of the present system, the device processing circuit 15 provides signal conditioning, data compression and data storage, while the operations 18/remote 19 processor provides data decompression and image processing.

It will be appreciated that the various memories discussed may be implemented as one or more memory units. Non-volatile memory is used to store the compressed data and instructions so that the device can function without continuous power. Volatile memory (RAM and cache) may be used to temporarily hold raw data and intermediate computations.

Visualization

The compressed ultrasound images are stored in non-volatile memory, such as a hard drive, SD Card or cloud storage. An operator wishing to view the logged conduit at a computer 18, 19 requests at least some of the stored, compressed images to be called from memory, uncompressed and combined into a visual representation of the conduit. This may be a 2D representation of a cross-section through the conduit or of a surface of the conduit. Alternatively, this may be a 3D representation of a length of the conduit. Although the underlying data is not visual data, visualization module renders the visual representation by treating the ultrasound reflections thru time-of-flight as physical solid features, such as surfaces or voids while removing some reflections as reverberations in the conduit or as particles in the fluid.

Thus the visualization module uploads compressed images, preferably from contiguous chunks of memory, into local memory, preferably video memory. A processor, preferably a GPU, un-compresses the compressed image to create uncompressed images. Each image is associated with a physical scale and adjacent pixels represent physically adjacent locations in the conduit. The visualization module uses a plurality of uncompressed images to create a 2D or 3D visual representation of the conduit.

The processor may perform additional image processing such as shading, texturing, and edge detection based on the physical locations represented by the image pixels. As discussed above, refinements to the visualization may be made by precisely calculating locations based on local speeds of sound of the waves in each part of the fluid and conduit.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A method of imaging a cylindrical fluid conduit, comprising:
   deploying and moving an ultrasound imaging device through the conduit, the device comprising a radial array of ultrasound transducers;
   capturing cross-sectional slices of the conduit using the radial array to create frames having plural scan lines;
   determining a speed of sound of a fluid in the conduit;
   applying a demodulation process and spatial conversion process to the scan lines; wherein the spatial conversion process creates a spatial pixel from one or more samples in the scan line using the determined speed of sound;
   creating an uncompressed ultrasound image comprising the demodulated, spatially converted scan lines; and
   applying video compression to the ultrasound image to return compressed images.

2. The method of claim 1, wherein an output includes two streams of compressed images of different bandwidths, a) a first stream of low-bandwidth compressed images, which is transmitted to a surface computer for real-time monitoring and b) a second stream of high-bandwidth compressed images, which is stored on non-volatile memory of the device.

3. The method of claim 1, wherein the spatial conversion process comprises converting scan lines from temporal dimensions to spatial dimensions, preferably with consistent spatial unit steps.

4. The method of claim 1, wherein the video compression includes Advanced Video Coding (AVC) (H.264), High Efficiency Video Coding (HEVC) (H.265), VP9 or variant thereof.

5. The method of claim 1, wherein the determining a speed of sound of a fluid in the conduit includes repeatedly determining the speed of sound while moving through the conduit to update the spatial conversion.

6. The method of claim 1, further comprising applying companding, preferably p-law quantization, to the ultrasound image.

7. The method of claim 1, further comprising uncompressing the compressed images at a processor separate from the imaging device and creating a 2D or 3D visualization of the conduit.

8. The method of claim 1, wherein scan lines comprise data received during a preset receive window and further comprising determining the inner and outer radii of the conduit then reducing the ultrasound image to pixels substantially between the determined inner and outer radii.

9. The method of claim 1, further comprising filtering uncompressed ultrasound images to remove certain features after demodulation.

10. A device for imaging a conduit comprising:
a body deployable in a cylindrical fluid conduit;
an outward-facing radial array of ultrasound transducers for capturing cross-sectional slices of the conduit; and
a processor for compressing the frames by:
applying a demodulation process and spatial conversion process to the scan lines wherein the spatial conversion process creates a spatial pixel from one or more samples in the scan line using a determined speed of sound of fluid in the conduit;
creating an uncompressed ultrasound image comprising the demodulated, spatially converted scan lines; and
applying video compression to the ultrasound image to return compressed images.

11. The device of claim 10, further comprising a non-volatile memory and a telemetry unit for transmitting data to a surface computer; and
wherein the processor is arranged to output two streams of compressed images of different bandwidths, a) a first stream of low-bandwidth compressed images, which is transmitted using the telemetry unit and b) a second stream of high-bandwidth compressed images, which is stored on the non-volatile memory.

12. The device of claim 10, wherein the spatial conversion process comprises converting scan lines from temporal dimensions to spatial dimensions, preferably with consistent spatial unit steps.

13. The device of claim 10, wherein the video compression includes Advanced Video Coding (AVC) (H.264), High Efficiency Video Coding (HEVC) (H.265), VP9 or variant thereof.

14. The device of claim 10, further comprising means for determining the speed of sound of a fluid in the conduit by repeatedly determining the speed of sound while moving through the conduit to update the spatial conversion.

15. The device of claim 10, wherein the processor further applies companding, preferably μ-law quantization, to the ultrasound image.

16. The device of claim 10, wherein scan lines comprise data received during a preset receive window and wherein the processor further determines the inner and outer radii of the conduit then reducing the ultrasound image to pixels substantially between the determined inner and outer radii.

17. The device of claim 10, wherein the processor further filters uncompressed ultrasound images to remove certain features after demodulation.

18. The device of claim 10, further comprising one or more sensors for measuring properties of the fluid or the transducer's position relative to the conduit, and wherein the processor uses these sensor(s) in the spatial conversion process.

19. The device of claim 10, the body being an elongate body.

* * * * *